Sept. 18, 1956
B. E. TOMS
2,763,494
TORSION BAR FRONT SUSPENSION
Filed Feb. 7, 1955
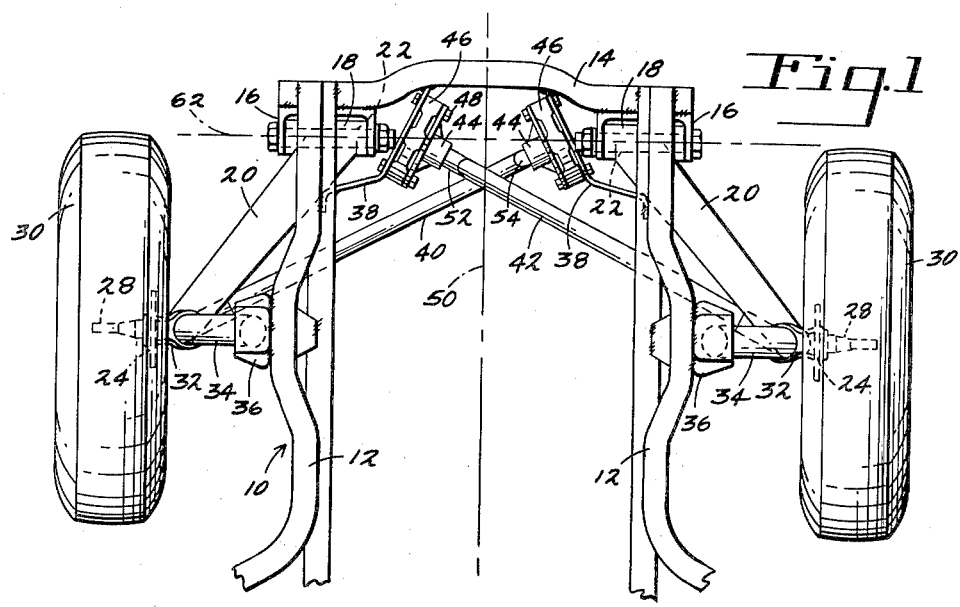
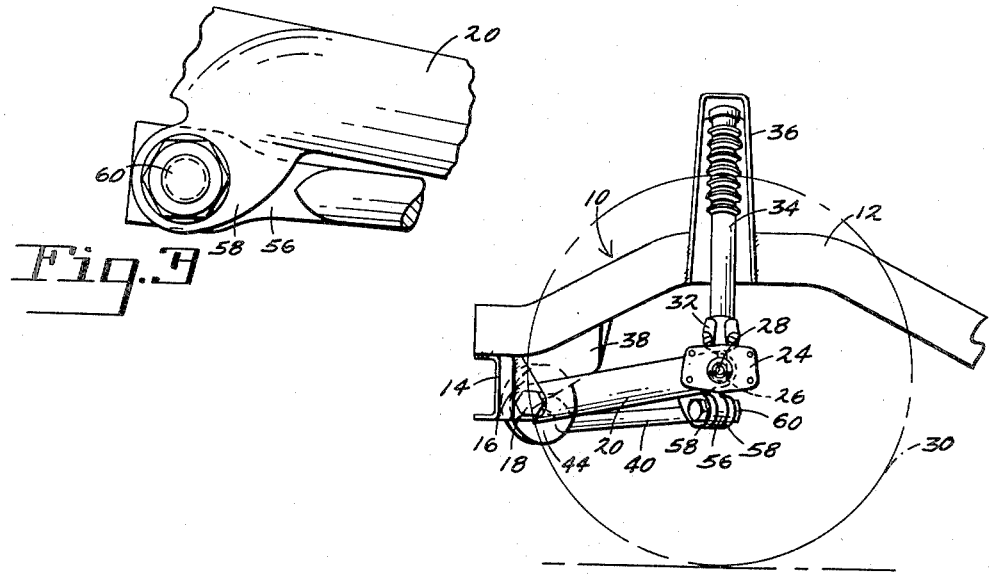
B. E. TOMS.
INVENTOR.

United States Patent Office 2,763,494
Patented Sept. 18, 1956

2,763,494

TORSION BAR FRONT SUSPENSION

Bruce E. Toms, Dearborn, Mich., assignor to Ford Motor Company, Dearborn, Mich., a corporation of Delaware Application February 7, 1955, Serial No. 486,542

4 Claims. (Cl. 280—124)

This invention relates generally to an independent wheel suspension for a motor vehicle, and has particular reference to an independent suspension for the front road wheels of a motor vehicle incorporating a pair of torsion bars.

In an embodiment of the present invention a trailing suspension arm is provided for each of the front road wheels, being pivotally mounted upon a forward portion of the vehicle frame for rotation about a common transversely extending horizontal axis. The trailing arms extend diagonally rearwardly and outwardly for connection at their rearward ends to spindle supports rotatably mounting road wheels. A pair of oppositely arranged diagonally extending torsion bars are provided, each being anchored at its forward end upon the vehicle frame at one side of the longitudinal center line thereof, and extending diagonally rearwardly and outwardly across this center line to the road wheel at the opposite side of the frame. The trailing suspension arm and the torsion bar for each road wheel are thus arranged at an acute angle to each other, and upon rising and falling movements of the wheels the resulting angular movement about the common horizontal transverse axis of the trailing arms results in torsionally stressing the torsion bars. In addition, the diagonally extending torsion bar strengthens the wheel mounting by affording additional stability thereto, particularly against wheel side thrust. A combined shock absorber and telescopic control strut may be provided for each wheel to complete the suspension system, with the lower end of the shock absorber being universally connected to the spindle support and with the upper end thereof being connected to a frame bracket.

Other objects and advantages of the invention will be made more apparent as this description proceeds, particularly when considered in connection with the accompanying drawing, wherein:

Figure 1 is a fragmentary plan view of the forward portion of the motor vehicle chassis incorporating the front wheel suspension of the present invention.

Figure 2 is a side elevation of the construction shown in Figure 1.

Figure 3 is a fragmentary enlarged side elevational view of the connection between the trailing suspension arm and the torsion bar.

Referring now to the drawing, the reference character 10 indicates generally the forward portion of a motor vehicle chassis having a pair of longitudinally extending side frame rails 12 interconnected at their forward ends by a cross frame member 14. A pair of U-shaped mounting brackets 16 are welded to the rearward side of the front cross frame member 14, and rotatably support the hubs 18 of suspension arms 20 of the trailing type, the pivotal connections being made by pivot shafts 22. It will be noted that the pivot shafts 22 are aligned with each to form a common transversely extending horizontal axis for the trailing suspension arms 20 at opposite sides of the vehicle.

Each of the trailing suspension arms 20 extends diagonally rearwardly, upwardly and outwardly from the vehicle frame 10, and is connected at its rearward end to a spindle support 24 by means of a ball joint 26. Each spindle support 24 has a spindle portion 28 rotatably supporting a front road wheel 30.

The spindle support 24 has an upwardly extending boss 32 receiving the lower end of the combined hydraulic shock absorber and tubular control member 34. The upper end of the shock absorber 34 is supported by means of a bracket 36 extending upwardly from the side frame rail 12. Any suitable type of shock absorber may be used, as for example that shown in the application, Serial No. 479,181, filed December 31, 1954, in the name of John G. McQuaid and George H. Muller, entitled "Shock Absorber," and having a common assignee with the present application. This type of shock absorber provides a structural supporting and guiding member as well as furnishing the normal shock absorbing function, but other types of shock absorbers may be used as well.

The vehicle frame 10 is provided at each side thereof with a diagonally extending frame reinforcing member 38 extending diagonally across the corner between the side frame rail 12 and the front cross frame member 14 and welded to each of said members. A pair of torsion bars 40 and 42 are provided, one for each front road wheel. Each torsion bar is secured at its forward end to a flange bracket 44 which in turn is connected to the adjacent diagonally extending frame reinforcing member 38 by means of a flexible coupling 46 and bolts 48. Each torsion bar extends diagonally rearwardly and outwardly from its anchorage to the frame reinforcing member 38, crossing each other at the longitudinal center line 50 of the frame 10. The torsion bars 40 and 42 are substantially identical, except that the forward end portions 52 and 54 are offset vertically in opposite directions to enable the two bars to cross each other without interference.

As best seen in Figures 2 and 3, the torsion bars 40 and 42 extend beneath the side frame rails 12 of the frame and are each formed with a flattened rearward end portion 56 positioned between a pair of ears 58 depending from the rearward portion of the trailing suspension arm 20. A pivot bolt 60 extends through the ears 58 and the rearward portion 56 of the torsion bar to form a pivotal connection therebetween.

From the foregoing it will be seen that the trailing arms swing about a common transversely extending horizontal axis 62 as the front road wheels 30 rise and fall relative to the vehicle frame. The torsion bars 40 and 42, which are arranged at an acute angle with the trailing suspension arms 20, are connected at their rearward ends to the rearward ends of the trailing suspension arms 20, the connection comprising a pivotal connection having an axis extending at right angles to the axis of the torsion bar. It will be apparent that the torsion bars 40 and 42 are torsionally stressed as the wheels rise and fall, since the rearward ends of the torsion bars must move in an orbital path about the axis 62. The forward ends of the torsion bars 40 and 42 are anchored at points lying upon the common transverse horizontal axis 62 of the trailing suspension arms 20, and the torsion bars and trailing arms thus form a triangulated suspension linkage compact in design and geometrically arranged to provide desirable ride characteristics. The diagonally extending torsion bars 40 and 42 assist the trailing suspension arms 20 in providing a stable suspension system and are effective in increasing the ability of the system to resist wheel side thrust.

It will be understood that the invention is not to be limited to the exact construction shown and described, but that various changes and modifications may be made

What is claimed is:

1. In an independent wheel suspension for the front road wheels of a motor vehicle having a frame including a pair of generally parallel longitudinally extending side frame rails interconnected near their forward ends by a transversely extending cross frame member, a pair of suspension members having hubs journaled upon the forward portion of said frame for rotation about a common transversely extending horizontal axis, said hubs being laterally spaced and each located at one side of said frame, said suspension members having trailing arm portions extending rearwardly from said hubs and connected at their rearward ends to said road wheels, and a pair of angularly related torsion bars, each of said torsion bars having one end anchored to a forward portion of said frame at one side of the longitudinal center line of the frame and extending diagonally rearwardly across said center line and converging toward the rearward end of the trailing arm portion of the suspension member at the opposite side of the frame, and means connecting the adjacent ends of the torsion bars and trailing arms at each side of the vehicle to torsionally stress said bars as said road wheels rise and fall relative to the vehicle frame.

2. The structure defined by claim 1 which is further characterized in that a combined hydraulic shock absorber and telescopic control strut extends upwardly from the interconnection between the torsion bar and trailing arm at each side of the vehicle and a frame bracket secured to each frame side rail supporting the upper end of each of said combined shock absorber and telescopic control struts.

3. In an independent wheel suspension for the front road wheels of a motor vehicle, a vehicle frame having a pair of generally parallel longitudinally extending side frame rails, a transversely extending cross frame member interconnecting the forward ends of said side frame rails, and a pair of frame reinforcing members extending diagonally between the cross frame member and the side frame rails at each side of the vehicle, a pair of suspension members having hubs journaled upon a cross frame member adjacent each side frame rail for rotation about a common transversely extending horizontal axis, said suspension members having trailing arms extending from said hubs diagonally rearwardly and outwardly toward said road wheels and connected at their rearward ends to said road wheels, and a pair of torsion bars each having its forward end anchored to one of said diagonally extending reinforcing frame members, each of said torsion bars extending diagonally rearwardly and outwardly toward the road wheel on the opposite side of the longitudinal center line of the frame from the anchored end of the torsion bar with said torsion bars crossing each other adjacent said center line, and means nonrotatably anchoring the opposite end of each of said torsion bars to the rearward end of the adjacent trailing arm to torsionally stress said bars as the road wheels rise and fall relative to said frame.

4. The structure defined by claim 3 which is further characterized in that the forward and inward ends of said torsion bars are mounted upon said reinforcing frame members substantially in transverse alignment with the common axis of the hubs of said suspension members, said mountings including flexible connections to accommodate movements of the anchored ends of said torsion bars as the outer ends thereof rotate with the rearward ends of said trailing arms about the common transversely extending axis of said hubs.

References Cited in the file of this patent

UNITED STATES PATENTS 2,596,922     Thoms _____ May 13, 1952

FOREIGN PATENTS 907,149     Germany _____ Mar. 22, 1954